(No Model.)
H. ROGERS.
VEGETABLE GRATER.
No. 284,487. Patented Sept. 4, 1883.
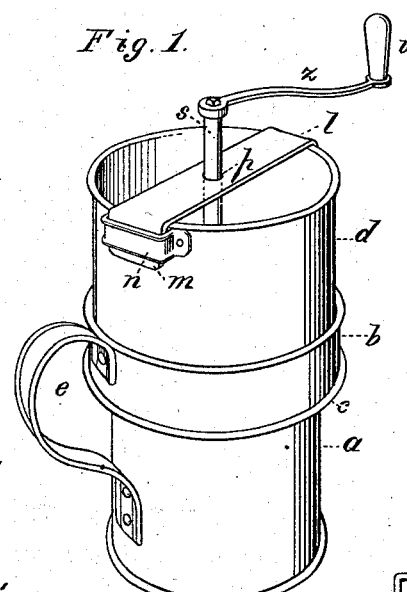
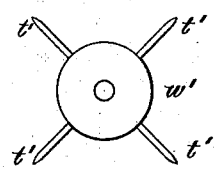
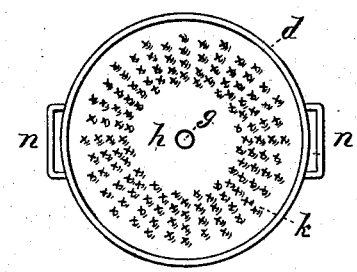
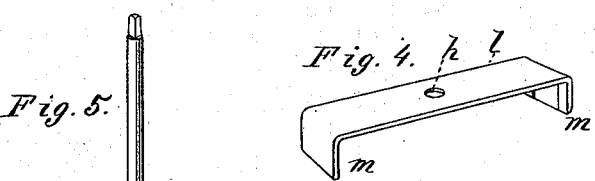
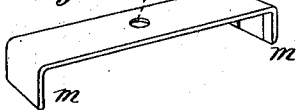
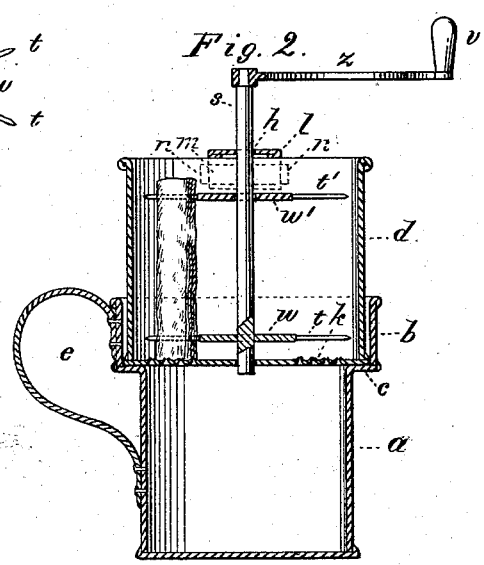
WITNESSES
Villette Anderson.
E. H. Bates.
INVENTOR
Hattie Rogers,
by Anderson & Smith
her ATTORNEYS

UNITED STATES PATENT OFFICE.

HATTIE ROGERS, OF POLO, ILLINOIS.

VEGETABLE-GRATER.

SPECIFICATION forming part of Letters Patent No. 284,487, dated September 4, 1883.

Application filed May 19, 1883. (No model.)

*To all whom it may concern:*

Be it known that I, HATTIE ROGERS, a citizen of the United States, residing at Polo, in the county of Ogle and State of Illinois, have invented certain new and useful Improvements in Vegetable-Graters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and shows a perspective view. Fig. 2 is a vertical section. Figs. 3, 4, 5, and 6 are detail views of different parts.

This invention has relation to vegetable-graters; and it consists in the construction and novel arrangement of the receiver, having an expanded upper portion, the grater-pan fitting therein, and having a center bearing for the vertical stem of the rotating holder, the removable upper bearing for said stem, the fixed lower head of the rotating holder having radial prongs, and the adjustable upper head also has radial prongs, all as hereinafter set forth.

In the annexed drawings, the letter $a$ designates the lower section or receiver, which is made with an expanded upper portion, $b$, having a flange-rim, $c$, in which is sealed the grating pan or vessel $d$.

$e$ is the handle of the lower vessel or receiver, whereby it is held in steady position when turning the rotary device which carries the horse-radish or other vegetables. The upper vessel, $d$, is formed with a central bearing, $g$, in the bottom thereof, around which is a smooth portion, $h$, of small diameter, exterior to which the bottom of the vessel is punched to form grating-perforations, as indicated at $k$.

At the top of the vessel is a removable transverse bearing-bar, $l$, the ends $m$ of which are turned down to engage the loop-ears $n$ of the grater-vessel, said ears being diametrically opposite to each other, as shown in the drawings. In the center of the bar $l$ is made a perforation, $p$.

$s$ indicates the central stem or shaft of the vegetable-holder, which carries near its lower end a rigidly-attached iron disk or wheel, $w$, having four or more radially-extended iron spikes or prongs, $t$, on which the vegetables to be grated are placed. A second iron disk, $w'$, having also radially-extended prongs $t'$, is placed on the stem $s$, above the wheel $w$, and is designed to engage the upper portions of the vegetables. It is arranged loosely on the shaft, so that as the vegetables are worn away in the grating-surface $k$ it can be adjusted downward. The lower end of the stem is arranged in the center bearing, $g$, of the grating-vessel, and its upper portion revolves in the perforation $p$ of the bearing-bar $l$.

$Z$ indicates a crank-arm, which engages a square bar on the upper end of the stem $s$, and is provided with a wooden sleeve-handle, $v$, on its vertical end portion, $r$, as shown in the drawings.

Having described the invention, what I claim, and desire to secure by Letters Patent, is—

1. A vegetable-grater consisting of the receiver-section having the expanded upper portion or bearing, the grating-vessel seated therein and having a center bearing, and removable transverse bearing-bar, the stem $s$, carrying a fixed iron disk having radial prongs, and above it a loose adjustable pronged disk, and having a crank-arm whereby it is operated, substantially as specified.

2. In a vegetable-grater, the combination, with a vessel having a perforated grating-bottom, of a rotating stem carrying near its lower end a fixed disk having radial prongs, and above it a loose adjustable disk, also having radial prongs, substantially as specified.

In testimony whereof I affix my signature in presence of two witnesses.

HATTIE ROGERS.

Witnesses:
 DAVID WOLF,
 AMOS SHAW.